United States Patent [19]

Tsukahara

[11] Patent Number: 5,581,457
[45] Date of Patent: Dec. 3, 1996

[54] CONTROL DEVICE FOR SEWING MACHINE AND CONTROL METHOD THEREFOR

[75] Inventor: Hisaaki Tsukahara, Tokyo, Japan

[73] Assignee: Mitsubishi Denki Kabushiki Kaisha, Tokyo, Japan

[21] Appl. No.: 578,494

[22] Filed: Dec. 26, 1995

[30] Foreign Application Priority Data

Jan. 12, 1995 [JP] Japan .......................................... 7-3347
Aug. 4, 1995 [JP] Japan ...................................... 7-199551

[51] Int. Cl.⁶ ............................ G05B 15/00; G05B 19/18
[52] U.S. Cl. ........................................ 364/131; 395/200.1
[58] Field of Search ................................. 395/425, 400, 395/200, 842, 200.08, 500, 325; 112/275; 318/632

[56] References Cited

U.S. PATENT DOCUMENTS 5,214,775  5/1993  Yabushita et al. .................... 395/200
5,410,654  4/1995  Foster et al. ............................ 395/275

FOREIGN PATENT DOCUMENTS 61-296407  12/1986  Japan ..................................... 364/131

Primary Examiner—Roy N. Envall, Jr.
Assistant Examiner—Yoncha Kundupoglu
Attorney, Agent, or Firm—Sughrue, Mion, Zinn Macpeak & Seas

[57] ABSTRACT

A control device for use in a sewing machine and a control method in which the memory contents of a memory element are read when a servo microcomputer generates an interrupt. The control device also changes sewing data by specifying a rewriting format when sewing data are changed, automatically detects the rewriting of the memory contents of a rewritable memory element due to noise, and restores the memory contents to their original state before they have actually been rewritten.

4 Claims, 7 Drawing Sheets

CONTROL DEVICE FOR SEWING MACHINE AND CONTROL METHOD THEREFOR

BACKGROUND OF THE INVENTION

This invention relates to an improvement of a control device for a sewing machine which operates under the control of a microcomputer.

With reference to FIGS. 6–8, the machinery and a control device of a conventional sewing machine will be described. FIG. 6 shows the machinery of the sewing machine, and FIG. 7 shows a control circuit in which a multiprocessor-type numerically controlled device, of a type such as that disclosed in Japanese Unexamined Patent Publication No. Sho. 61-296407, is employed as the control device of a sewing machine.

In FIG. 6, reference numeral 11 designates a sewing machine which accommodates a mechanism for stitching an article to be sewed thereon. This sewing machinery 11, disposed on a table 12, is provided with a needle bar 13 for stitching an article, a needle position detector 13a for detecting the position of the needle bar 13, and a cloth presser foot 17 for holding the article between an upper presser bar 15 and a lower presser bar 16 in a pressed manner. This cloth presser foot 17, which is located on a bed slide 18, is provided with an XY table 19 which feeds the article to be stitched in the XY plane, and origin detectors 20a and 20b for detecting the mechanical origin of the XY table 19.

An operation panel 22, on which various types of switch are provided for setting the operation of the sewing machine, is disposed on the upper surface of a control box 10. This operation panel 22 is provided with a liquid crystal display (hereinafter referred to as an LCD) 24 for displaying stitching conditions, and switches 27 for various purposes. A floppy disk (hereinafter referred to as an FD) 34 is inserted as a fourth memory element into an FD read/write section 30 formed in the front surface of the control box 10. A foot pedal 31 is provided at a lower part of the control box 10. This foot pedal 31 has a start switch 32 for providing a sewing start instruction and a cloth press switch 33 for causing the cloth presser foot 17 to hold cloth in a pressed manner.

FIG. 7 shows a control circuit housed in the control box 10 which controls the sewing machine. The control circuit has a main microcomputer 1 which serves as a first microcomputer, a servo microcomputer 2a which acts as a second microcomputer for controlling a servo motor 21, and a table microcomputer 2b for controlling pulse motors 19a and 19b which drive the XY table 19. The main microcomputer 1 is arranged so as to issue a control instruction to the servo microcomputer 2a and the table microcomputer 2b.

The main microcomputer 1 is connected to a ROM 52 which holds a start program, or the like, a RAM 50 which holds data regarding the number of stitches and a needle stroke necessary for creating a desired sewing pattern, and a nonvolatile rewritable flash memory 51 which acts as a first memory element.

As shown in FIG. 8, the memory contents of this flash memory includes programs 100, 101, and 102 for controlling the main microcomputer 1, the servo microcomputer 2a, and the table microcomputer 2b, display data 103 of the LCD 24 provided in the operation panel 22, parameters 104 of a plurality of blocks which consist of a scaling factor for sewing data and feeding action data, and a plurality of blocks of sewing data 105.

Each of the servo microcomputer 2a and the table microcomputer 2b may be provided with a specialized ROM which holds the start program or the like, and a specialized flash memory which holds a control program or the like. However, an increase in the number of memory devices complicates control, thereby resulting in a large-sized circuit board. To avoid such an increase in the size of the board, the present invention employs a control circuit having the configuration shown in FIG. 7.

The main microcomputer 1 is connected to the servo microcomputer 2a via an arbitration circuit 60a which arbitrates between rights (i.e., access rights) of the main microcomputer 1 and the servo microcomputer 2a. Similarly, the main microcomputer 1 is connected to the table microcomputer 2b via an arbitration circuit 60b. Interface RAMs 62a and 62b are connected to and controlled by the arbitration circuits 62a and 60b. The interface RAMs 60a and 62b transfer the memory contents of the flash memory 51 and exchange data between the main microcomputer 1 and the servo microcomputer 2a (or the table microcomputer 2b). Here, the interface RAM 62a is referred to as a second memory element.

The main microcomputer 1 is connected to an address latch 55a and a decoder 56a. The servo microcomputer 2a is connected to a RAM 63a which serves as a third memory element, and the table microcomputer 2b is connected to a RAM 63b and a decoder 56b.

The main microcomputer 1 is connected to the operation panel 22 via an interface 22a, the FD read/write section 30 via an FD control device 30c, and a reset circuit 70 which provides a reset instruction to the main microcomputer 1. The servo microcomputer 2a is connected to the servo motor 21 via a drive circuit 21b, and to a solenoid 17a which drives the cloth presser foot 17 via a drive circuit 17b. The table microcomputer 2b is connected to the needle position detector 13a via an interface 13c, the origin detectors 20a and 20b via an interface 20c, the pulse motors 19a and 19b, which drive the XY table 19, via a drive circuit 19c, and the foot pedal 31 via an interface 31a.

With reference to FIGS. 6 and 7, the operation of the control device of the sewing machine will be described. When the power for the control circuit of the sewing machine is turned on, the reset circuit 70 releases the main microcomputer 1 from its reset state, and the program stored in the ROM 52 is executed. Control programs 101 and 102 stored in the flash memory 51 are transferred to and stored in the interface RAMs 62a and 62b using the arbitration circuits 60a and 60b. Thereafter, the control programs are further transferred respectively to the RAMs 63a and 63b from the interface RAMs 62a and 62b. After the completion of the transfer of the programs, the main microcomputer 1 activates the servo microcomputer 2a and the table microcomputer 2b by releasing them from the reset state.

When stitching is started by pressing the start switch 32, the servo microcomputer 2a drives a servomotor via the drive circuit 21b and actuates the needle bar 13, as well as driving the solenoid 17a and actuating the cloth presser foot 17 via the drive circuit 17b, according to the control programs or the like stored in the RAM 63a. At the same time, the table microcomputer 2b sequentially reads the sewing data stored in the RAM 63b, and activates the drive circuit 19a based on the sewing data and the angle read by the needle position detector 13a. The table microcomputer 2b further drives the pulse motors 19a and 19b and causes the needle bar 13 to stitch the article to be stitched by moving the XY table 19 to a desired position based on the speed detected by the drive circuit 21b and a speed instruction from the RAM 63b.

If the stitching is carried out by changing the sewing data, new sewing data are input to the controller using the switches 27 of the operation panel 22, or the sewing data stored in the FD 34 are read by the control device.

With the previously mentioned configuration of the control device of the conventional sewing machine, if the servo microcomputer 2a generates an interrupt for the purpose of improving the controllability of the servomotor 21 while the main microcomputer 1 has the right to use the interface RAM 62a, neither the memory contents of the interface RAM 62a where a start address of the interrupt request is situated, nor the memory contents of the RAM 63a, can be read, which makes it impossible to control the servo microcomputer 2a. The servo microcomputer 2a is a one-chip microcomputer, and an execution start address and an interrupt start address coexist in the memory area of the interface RAM 62a because the execution start address and the interrupt start address, which starts interrupt processing when an interrupt is generated, are very close to each other. Accordingly, if the servomotor 2a generates an interrupt while the main microcomputer 1 has the right to use the interface RAM 62a, it is impossible to read the interrupt address of the interface RAM 62a.

When the control program or the like of the flash memory 51 is to be altered, a language to be used for that purpose cannot be selected. Hence, the alteration of the control program can be troublesome, depending on its content.

The control program or the like is stored in the rewritable flash memory 51. Since the flash memory is rewritable, the memory contents of the flash memory may occasionally need to be rewritten for some reason, thereby causing an interruption in the control of the sewing machine.

The present invention is conceived to solve the first problem, and an object of the invention is to provide a control device for use in a sewing machine and a control method which enable the memory contents of a memory element to be read when a servo-microcomputer generates an interrupt.

The present invention is also conceived to solve the second problem, and accordingly another object of the invention is to provide a control device for use in a sewing machine which can change sewing data by specifying a rewriting format when sewing data are changed.

The present invention further is conceived to solve the third problem, and hence yet another object of the invention is to provide a control device for use in a sewing machine which can automatically detect the rewriting of the memory contents of a rewritable memory element due to noise, and can restore the memory contents to their original state before they have actually been rewritten.

SUMMARY OF THE INVENTION

According to a first aspect of the invention, there is provided a control device for a sewing machine, comprising:

a plurality of microcomputers including a first microcomputer for issuing a control instruction to a second microcomputer and a second microcomputer for controlling a servomotor which serves as a drive source for stitching an article to be stitched;

a readable and writable non-volatile first memory element for storing programs of the plurality of microcomputers;

a second memory element capable of being accessed for reading by any of the plurality of microprocessors, for reading and storing contents stored in the first memory element;

a third memory element capable of being accessed by the second memory element for reading and writing of the program of the second microcomputer;

first transfer means for writing and storing the program of the first microcomputer from the first memory element into the first memory element when the program of the first microcomputer is started;

second transfer means for storing, in the third memory element, the program transferred to and stored in the second memory element;

address changeover means for switching between start addresses of the second memory element and the third memory element;

element selection means for selecting the second memory element or the third memory element;

memory map reversing means for reversing memory maps of the second memory element and the third memory element based on a signal from the address changeover means and a signal from the element selection means, and for selecting the third memory element; and interrupt means for causing the memory map reversing means to reverse the memory maps after the program of the second microcomputer has been stored into the second and third memory elements by the first and second transfer means, and for causing the second microcomputer to interrupt the third memory element after the third memory element has been selected.

According to a second aspect of the invention, there is provided a control method for a sewing machine which is provided with a first microcomputer for issuing a control instruction to a second microcomputer and the second microcomputer for controlling a servomotor which serves as a drive source for stitching an article to be stitched, the control method comprising the steps of:

transferring memory contents of a first memory element which stores respective programs of the first and second microcomputers to a second memory element when the program of the first microcomputer is started;

transferring the memory contents transferred to the second memory element to a third memory element;

reversing memory maps of the second memory element and the third memory element, and causing the second microcomputer to select the third memory element; and causing the second microcomputer to interrupt the third memory element.

According to a third aspect of the invention, in the control device of the first aspect, the first memory element includes memory areas for storing the respective programs of the first and second microcomputers and a memory area for storing sewing data, and the control device further comprises:

selection means for selecting among the memory areas of the first memory element;

language selection means for selecting a language to be used in altering contents of the memory area; and alteration means for altering the contents of the memory area selected by the selection means by using the language selected by the language selection means.

According to a fourth aspect of the invention, in the control device of the first aspect, the control device further comprises:

a fourth memory element for storing the same memory contents as the first memory element;

computation means for executing a program in a memory area of the first memory element, to obtain a prescribed calculated value;

comparison means for judging, by comparison, whether a pre-calculated reference value coincides with the calculated value of the computation means; and third transfer means for transferring the contents of a memory area of the first memory element from a memory area of the fourth memory element when the comparison means finds a disagreement.

DESCRIPTION OF THE PREFERRED EMBODIMENTS

First Embodiment

Figure 1:
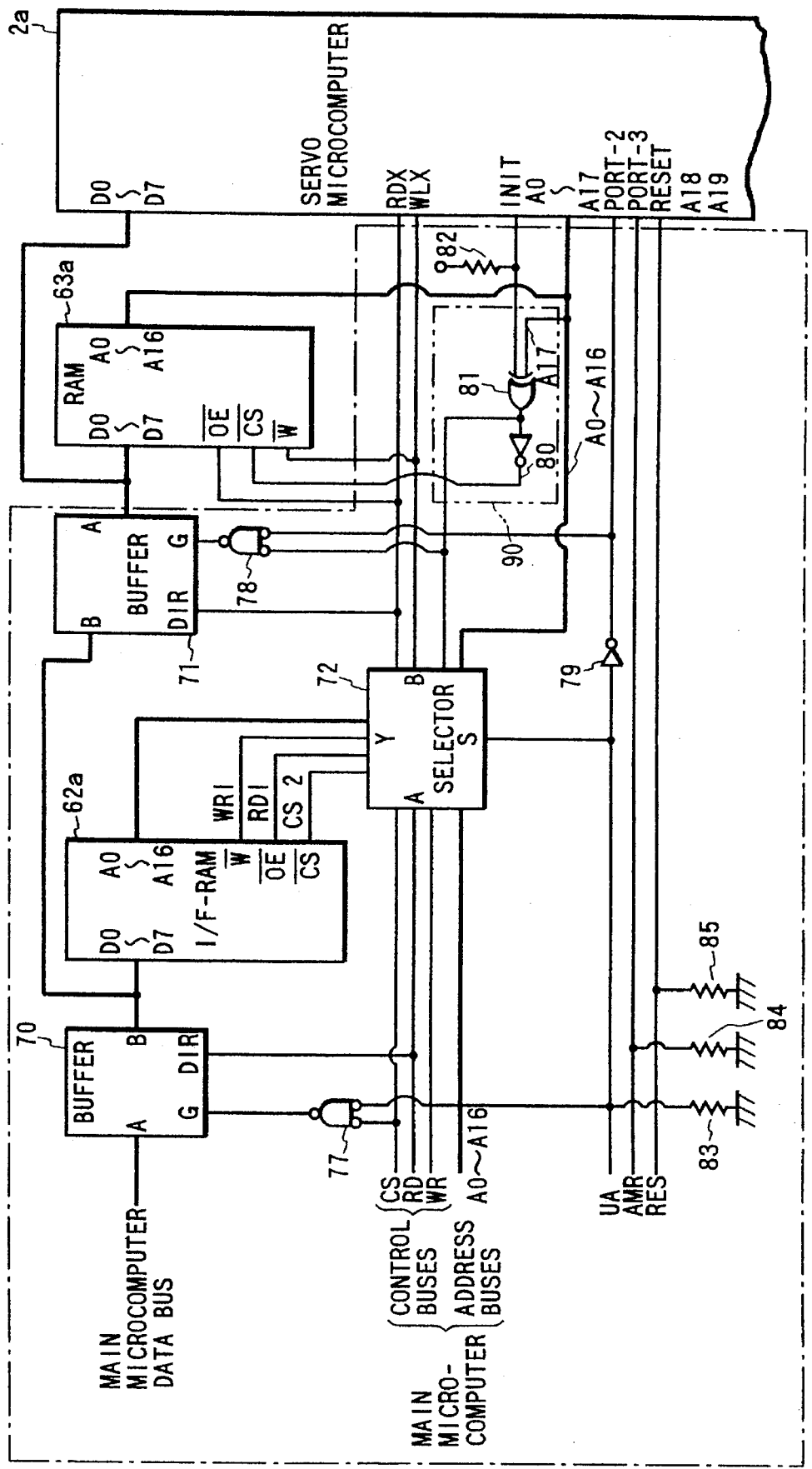
FIG. 1 shows a selection circuit according to a first embodiment of the present invention.

A control device for use in a sewing machine according to a first embodiment of the present invention will be described with reference to FIG. 1. Throughout the drawings, the same reference numerals are provided to designate the corresponding features of the conventional control device. In FIG. 1, a selection circuit is chiefly made up of a buffer element 70 which controls data transmission between the main microcomputer 1 and the interface RAM 62a by enabling and disabling transmission, a buffer element 71 which controls data transmission between the interface RAM 62a and the RAM 63a by enabling and disabling the data transmission, and a selector element 72 which controls the transmission of each of an address signal, a write signal, a read signal, and a chip selection signal from the servo microcomputer 2a by enabling and disabling the transmission.

The buffer elements 70 and 71 are bidirectional buffer elements having gates and control the transmission of signals of a terminal group A and a terminal group B. (1) When the ground terminal is high, the signal transmission is interrupted. (2) When the ground terminal is low and a DIR terminal is low, a signal is transmitted from the B terminal to the A terminal. Contrary to this, when the DIR terminal is high, a signal is transmitted from the terminal A to the terminal B. For example, a TTL74245 element has such a function.

A terminal A of the buffer element 70 is connected to a data bus of the main microcomputer 1, and a terminal B of the same is connected to a terminal B of the buffer element 71 and data terminals D0–D7 of the interface RAM 62a. The G terminal of the buffer element 70 is connected to a chip selection control bus CS and a signal line UA via an OR element 77, and the DIR terminal of the same is connected to a control bus RD. A terminal A of the buffer element 71 is connected to the RAM 63a and data terminals D0–D7 of the microcomputer 2b, and a G terminal of the same is connected to an output of an OR element 81 and a port-2 via an OR element 78. A DIR terminal of the buffer element 71 is connected to an RDX terminal. The buffer elements 70 and 71 control the on and off of the data transmission of the interface RAM 62a or the RAM 63a.

When the S terminal of a selector element 72 is high, a signal of the terminal group A is transmitted to a terminal group Y. Contrary to this, when the S terminal is low, a signal of the terminal group B is transmitted to a terminal group Y. A TTL74157 element has such a function. A terminal A of the selector element 72 is connected to address buses A0–A16, a write control bus WR, a read control bus RD, and a chip selection control bus CS of the main microprocessor 1. A terminal B of the selector element 72 is connected to a write terminal WLX and a read terminal RDX of the servo microcomputer 2b, the addresses A0–A16 of the servo microcomputer 2b and the RAM 63a, and OE and W terminals of the RAM 63a. A terminal Y of the selector element 72 is connected to address terminals A0–A16, a write terminal W, a read terminal OE, and a chip selection terminal CE of the interface RAM 62a. A terminal S of the selector element 72 is connected to a selection signal line UA which switches the direction of the transmission of a signal. This selection signal line UA is further connected to a NOT element 79 via the port-2.

(1) When the selection signal line UA is high, signals from the address buses A0–A16 and the signal lines CS, RD, and WR of the main microprocessor 1 are transmitted to the terminals A0–A16 and the CS, OE, and W terminals of the interface RAM 62a. (2) When the selection signal line UA is low, signals from the address buses A0–A16, and the RDX and WLX terminals of the servo microcomputer 2b, and an output from the OR element 81, which will be described later, are transmitted to the terminals A0–A16 and the CS, OE, and W terminals of the interface RAM 62a.

A selection circuit 90 which acts as a memory map reversing means, will now be described. This selection circuit 90 is configured so as to reverse a memory map while selecting either the interface RAM 62a or the RAM 63a by combining a high or low signal of an INIT terminal which serves as an element selection means with a high or low signal of an address line A17 which serves as an address changeover means.

An input of the OR element 81 of the selection circuit 90 is connected to an INIT terminal (port-1) of the servo microcomputer 2a, a signal power source via a resistor 82, and an address line A17. The output of this OR element 81 is connected to the terminal B of the selector element 72, the G terminal of the buffer element 71, and the chip selection terminal CS of the RAM 63a via the NOT element 80.

A port-3 and a reset terminal of the servo microcomputer 2a are connected respectively to a detection signal line AMR, which informs the main microcomputer 1 of the start-up of the microcomputer 2a, and a reset signal line RES which controls on-off operation of the microcomputer 2a. The signal lines UA, AMR, and RES are respectively grounded through resistors 83, 84 and 85.

Figure 2:
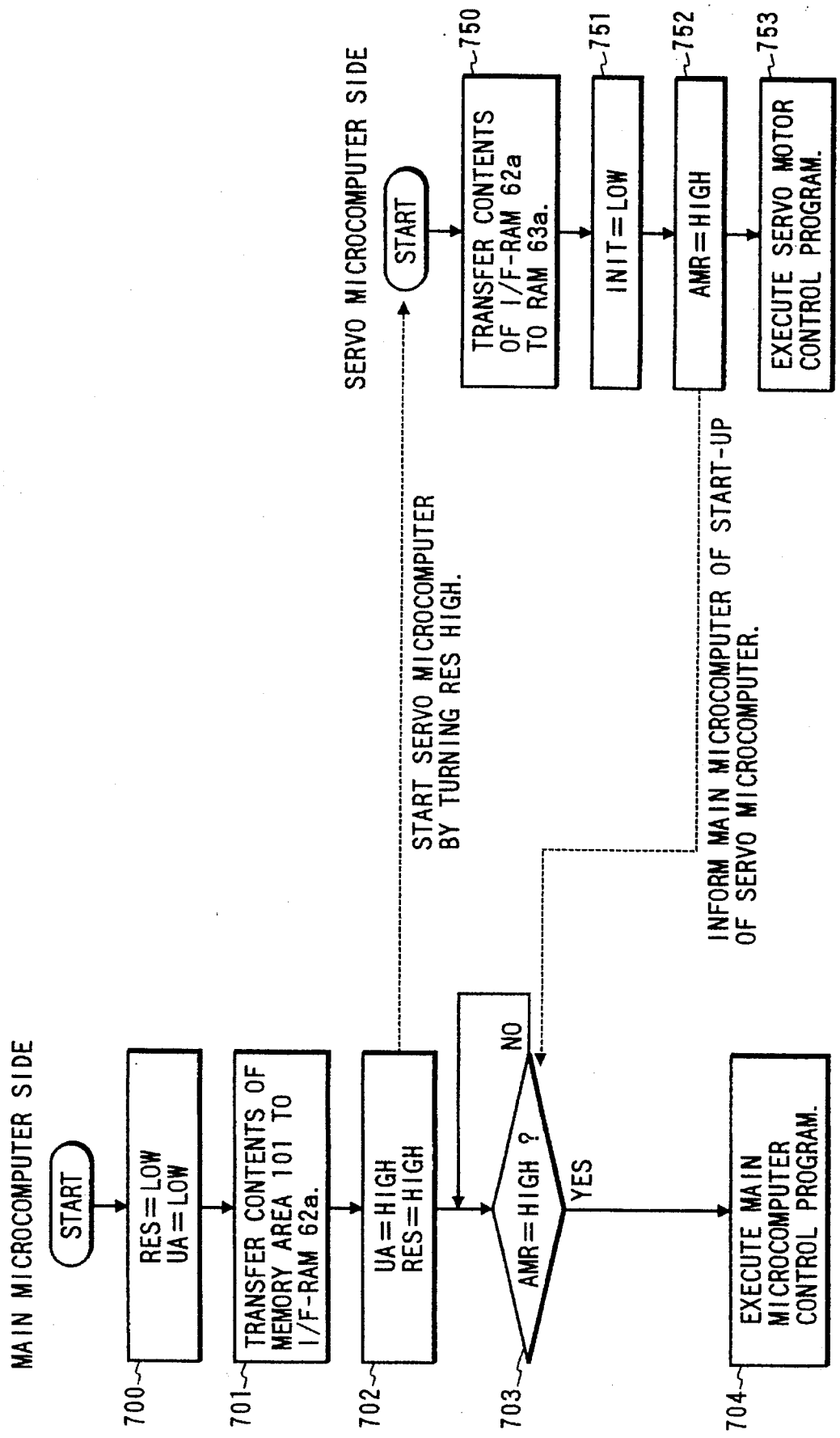
FIG. 2 is a flowchart showing the operation of a control device according to the first embodiment.

The operation of the control device according to this embodiment will be described with reference to the flowchart shown in FIG. 2. The servo microcomputer 2a and the table microcomputer 2a are substantially the same in operation, and hence only the operation of the servo microcomputer 2a will be explained.

First, the main microcomputer 1 carries out the following operations. It drives the signal line RES low, resets the servo microcomputer 2a, drives the signal line UA low, and prohibits the servo microcomputer 2a from accessing the interface RAM 62a and writing a program in the interface RAM 62a since the control bus CS is high (step 700). Subsequently, the control bus CS is brought into a low state from a high state, and the G terminal of the buffer element 70 is switched low via the OR element 77 since the signal line UA remains low. The data read control bus RD of the main microcomputer 1 is switched high, and data of the terminal group A are transmitted to the terminal group Y because the S terminal of the selector element 72 is also low, whereby the interface RAM 62a is selected. Memory contents of a control program area 101 of the flash memory 51 are transmitted from the terminal A to the terminal B of the buffer element 70 via the data bus of the main microcomputer 1, and the thus-transmitted memory contents are written into the interface RAM 62a (step 701).

After this writing operation has been completed, the main microcomputer 1 drives the signal of the signal line UA high, and the INIT terminal is pulled up to a high state by the resistor 82. Since the address terminal A17 is low, the G terminal of the buffer element 71 becomes high and active, whereby it becomes possible for the servo microcomputer 2a to access the memory contents of the interface RAM 62a. The G terminal of the buffer element 70 becomes high and active. Thereafter, the main microcomputer 1 drives the signal line RES high and releases the servo microcomputer 2a from its rest state (step 702).

As a result of being released from its reset state, the servo microcomputer 2a starts the execution of a program from start address FFFF0, and reads memory data at FFFF0. A memory map at this time is shown by "signal line INIT= High" in FIG. 3.

The signal line INIT of the servo microcomputer 2a is high, and a signal on an address line A17 of the servo microcomputer 2a becomes high, as a result of which an output of the XOR element 81 becomes low, and the G terminal of the buffer element 71 becomes low and active. Further, a data read RDX signal of the servo microcomputer 2a becomes low, and the buffer element 71 transmits data from the terminal B to the terminal A, whereas the selector element 72 transmits data from the terminal B to the terminal Y. Thus, it becomes possible for the servo microcomputer 2a to read and execute the memory contents, such as a program, of the interface RAM 62a.

This program holds an instruction to transmit the memory contents of the interface RAM 62a to the RAM 63a, and hence memory contents stored from start address E0000 to address FFFFF are transmitted to addresses between C0000 and DFFFF, as a result of which the memory contents of the interface RAM 62a and the RAM 63a become the same (step 750).

After the transmission of the memory contents has been completed, the output port of the servo microcomputer 2a is reset and the signal line INIT is switched low (step 751). The address line A 17 remains high, and hence the output of the XOR element 81 becomes high and the output of the NOT element 80 becomes low, whereby a chip of the RAM 63a is selected. The memory map at this time becomes as shown by "signal line INIT=Low" in FIG. 3.

Figure 3:
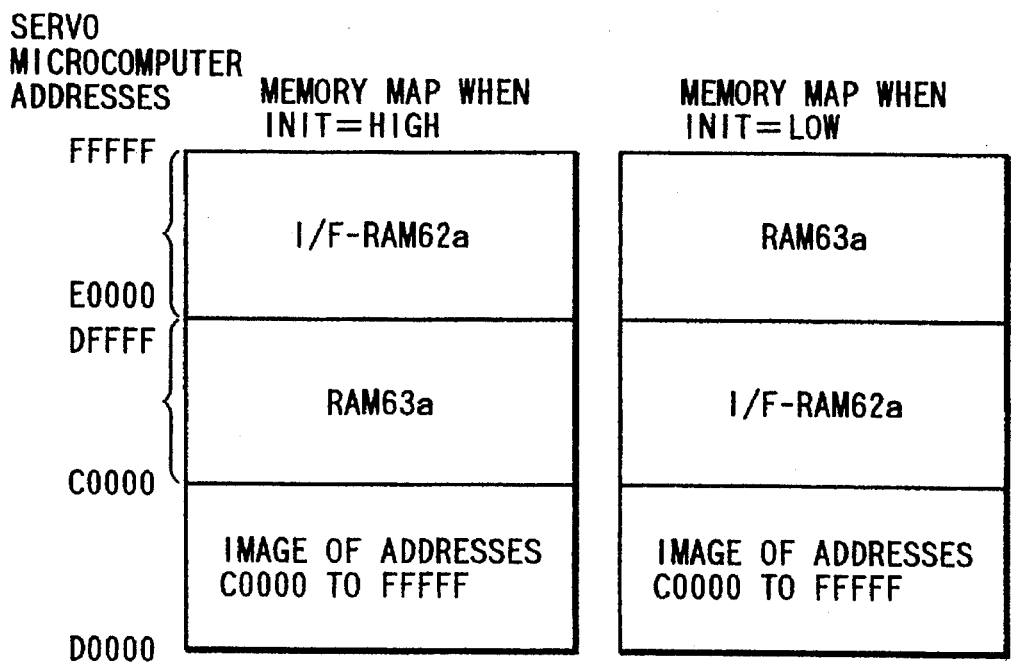
FIG. 3 is a memory map according to the first embodiment.
Figure 8:
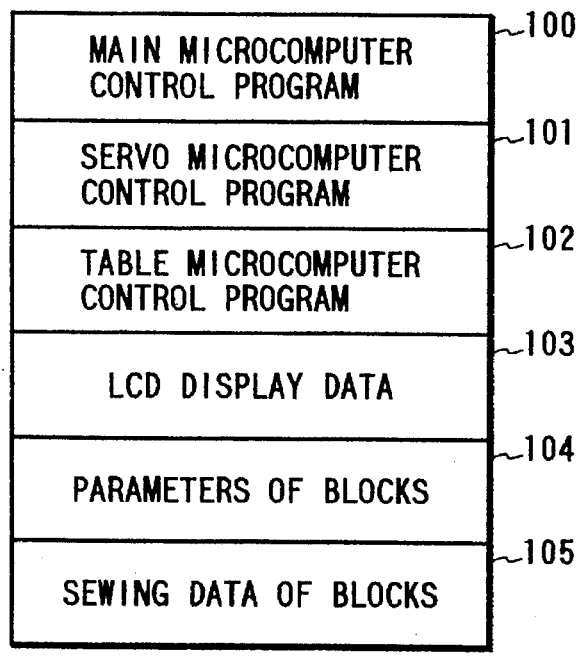
FIG. 8 is a schematic representation of memory areas of a conventional memory.

When the output of the INIT terminal falls from high to low, the memory map of the interface RAM 62a and the RAM 63a as viewed tom the servo microcomputer 2a becomes reversed. As shown in FIG. 3, the control program of the microcomputer 2a is switched from the contents of the microcomputer 2a to the memory contents of the RAM 63a, whereby the memory contents of the interface RAM 62a and the RAM 63a become the same. In this state, when the servo microcomputer 2a generates an interrupt, it is possible to read the interrupt address of the RAM 63a.

After the control program of the servo microcomputer 2a has been switched to the contents of the RAM 63a, the control program of the microcomputer 2a switches the signal line AMR high (step 752). After having detected that the signal line AMR became high and that the activation of the servo microcomputer 2a has been completed, the main microcomputer 1 executes a control program by synchronizing the main microcomputer 1 with start timing of the control of the servo microcomputer 2a. During the execution of the control program, the main microprocessor 1 and the servo microcomputer 2a establish handshake communication using the signal lines UA and AMR, and alternatively yield the right to use the interface RAM 62a to each other, whereby each control program is executed (steps 704 and 753).

In the above-mentioned embodiment, steps 701 and 750 respectively designate first and second transmission means, respectively.

Second Embodiment

A control device for use in a sewing machine according to a second embodiment is provided with the flash memory 51 in which programs or data of the sewing machine are stored in a plurality of areas, and the switches 27 which act as selection means and language selection means for selecting the memory areas of the flash memory 51, whereby the selected memory area is changed by specifying a language.

Figure 4:
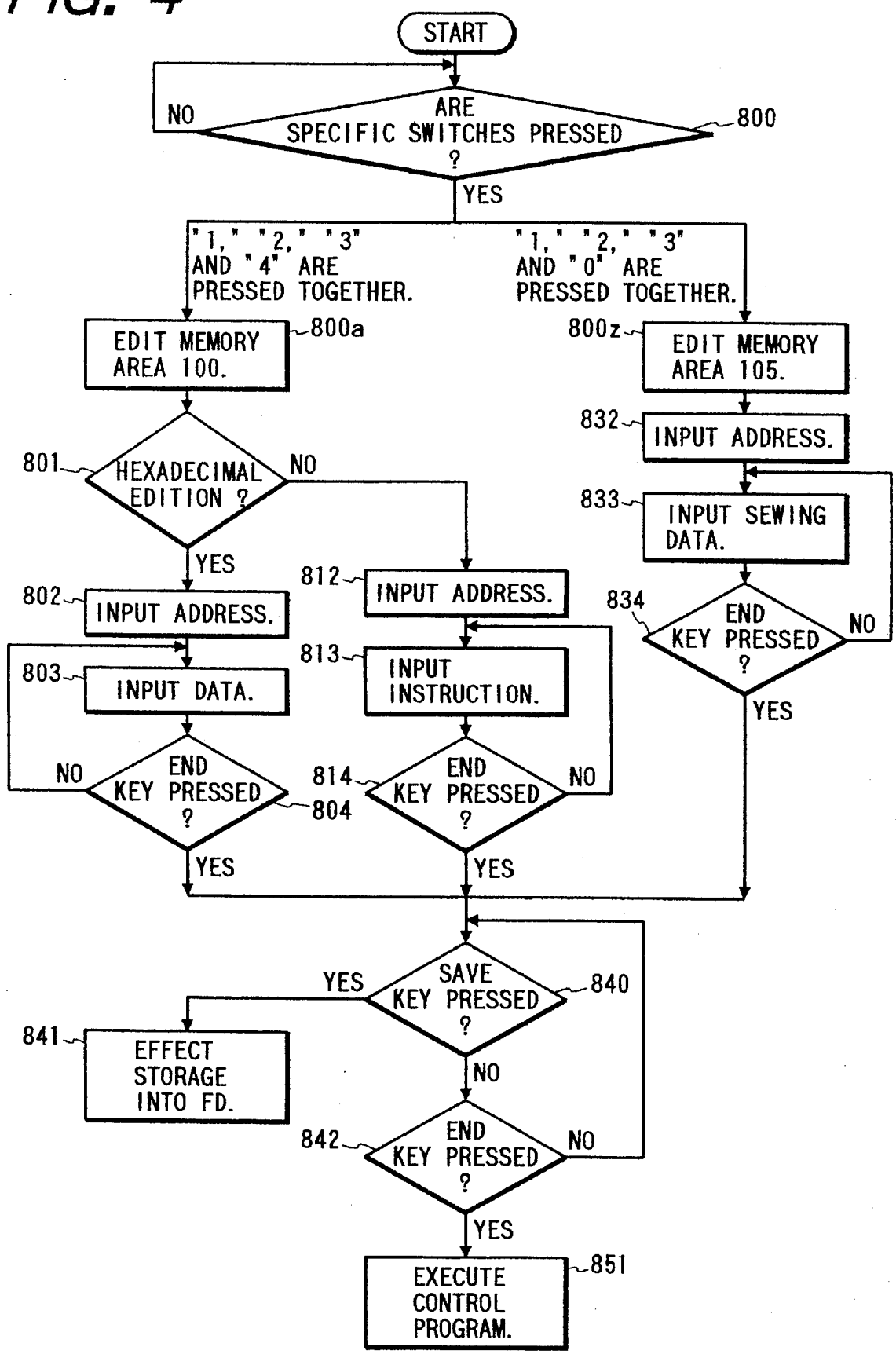
FIG. 4 is a flowchart showing the operation of a control device according to a second embodiment of the present invention.

The operation of the control device of this sewing machine will be described with reference to FIG. 4. Assume that the main microcomputer 1 is executing the program stored in the ROM 52.

It is checked whether or not specific switches of the switches 27 are pressed (step 800). If switches "1"–"4" are pressed together, a program which performs read and write operations on a control program area 100 of the flash memory 51 is altered (step 800a). If these switches are not pressed, the control device enters a standby state to check the pressing of the switches.

A modification format is selected by specifying a software language. The reason why the modification format is selected is that the complexity of modification is different depending on the size of modification. For example, if the modification is a minor change, such as a change of the destination of jump in a branch instruction, it is easy to change the instruction using hexadecimal digits. However, if the instruction is drastically changed, the use of an assembler language is needed to facilitate the change of the instruction. Hence, the language is previously set to either the hexadecimal digits or the assembler language, by the switches 27.

It is determined whether or not the change is carried out using hexadecimal digits (step 801). If the change of an instruction is carried out using hexadecimal digits, the address of the flash memory 51 is input from the switches 27. An ENTER key is pressed, so that an instruction stored in the address is read and converted into hexadecimal digits. The thus converted digits are displayed on the LCD 24 (step 802). An instruction to be written into that address is input in hexadecimal digits by means of the switches 27, and this instruction is written into the specified address by pressing the enter key (step 803).

On the other hand, if an instruction is changed using the assembler language in step 801, the address of the flash memory 51 is input by the switches 27, and an instruction stored in that address is read by pressing the enter key. The thus read instruction is converted into the assembler language, and the converted instruction is displayed on the LCD 24 (step 812). An instruction to be written into that address is input in assembler language using the switches 27, and the instruction in assembler language is written into the specified address by pressing the enter key (step 813).

There is the following correspondence between the simultaneously-pressed switches and program areas of the flash memory 51. The switches "1"–"3" and "6" correspond to a control program area 101, the switches "1"–"3" and "7" correspond to a control program region 102. The switches "1"–"3" and "8" correspond to a display data area 103, and the switches "1"–"3" and "9" correspond to a parameter area 104.

When the parameter area 104 is changed, the object to be changed is data. Hence, the use of hexadecimal digits facilitates the change of the data. Contrary to this, when the display data area 103 is changed, the object to be changed is displayed character data, and hence the use of displayed characters facilitates the change of the display data area 103.

If the switches "1"–"0" are pressed together, a program which performs read and write operations on a sewing data area 105 composed of a plurality of blocks is altered (step 800z).

If the object to be changed is the sewing data, it is easy to change the sewing data by changing the data to data for one stitching action. The address of the flash memory 51 is input using the switches 27, and sewing data stored in that address are read by pressing the enter key, and the thus read sewing data are displayed on the LCD 24 (step 832).

Sewing data to be written into that address are input using the switches 27, and the input data are written into the specified address by pressing the enter key (step 833).

To finish steps 803, 813, and 833, each modification mode is completed by pressing an end key (step 804, 814 and 834).

Contents of each area of the thus modified flash memory 51 are stored in the FD 34 by pressing a SAVE key among the switches 27 (step 840 and 841). When the END key is pressed (step 842), contents of the control program areas 101 and 102 of the flash memory 51 are transferred to the RAMs 63a and 63b. There after, the control program of the main microprocessor 1 stored in the flash memory 51 is executed (step 851). In this embodiment, steps 802, 803, 812, 813, 832, and 833 serve as the alteration means.

Third Embodiment

A control device for use in a sewing machine according to a third embodiment is designed to determine whether or not each memory content of the flash memory 51 is in a normal condition. If the result of this determination is defective, contents which are the same as the memory contents of the flash memory 51 are read from the FD 34. The thus-read contents are transferred to the defective memory area of the flash memory 51.

Figure 5:
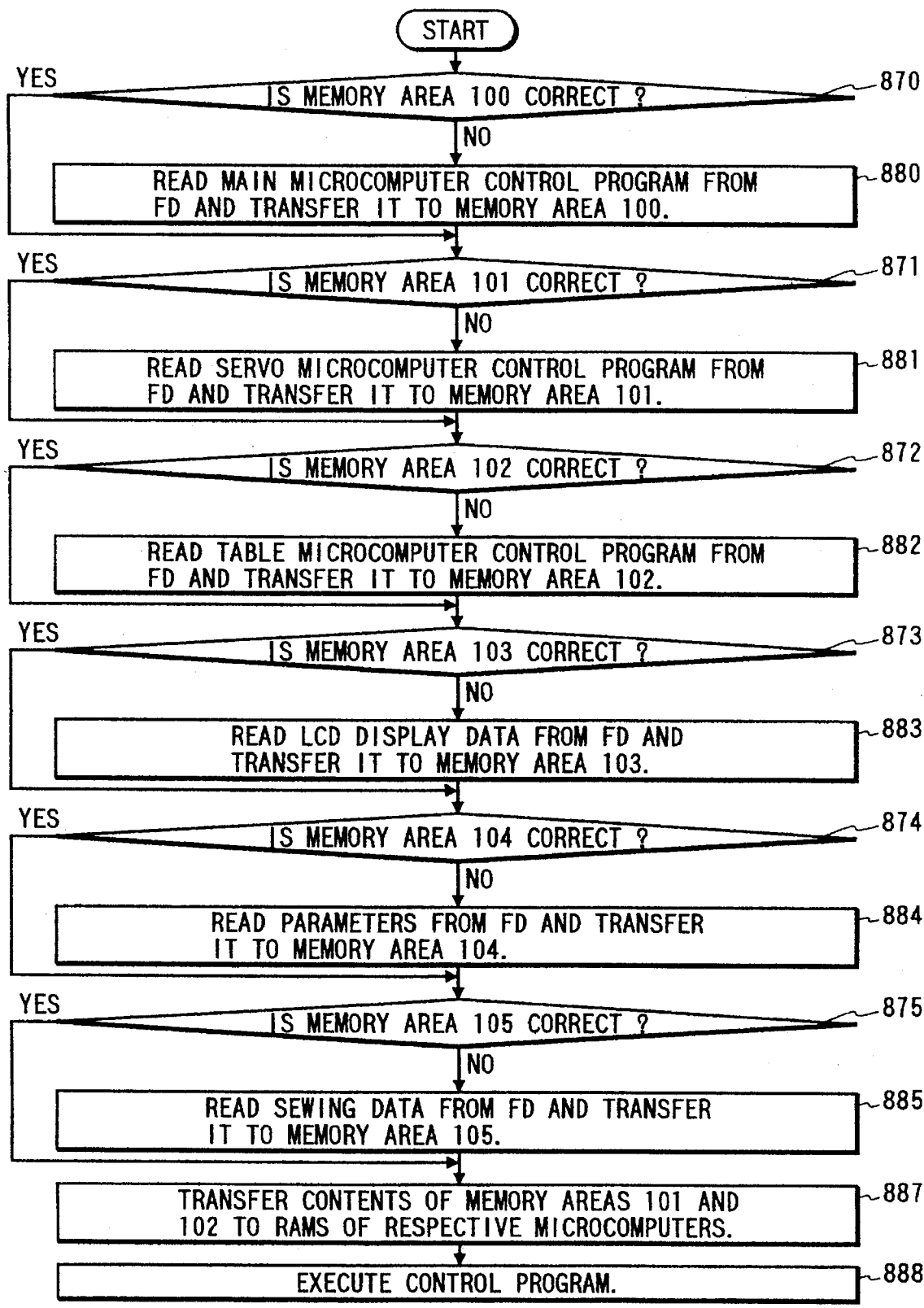
FIG. 5 is a flowchart showing the operation of a control device according to a third embodiment of the present invention.
Figure 6:
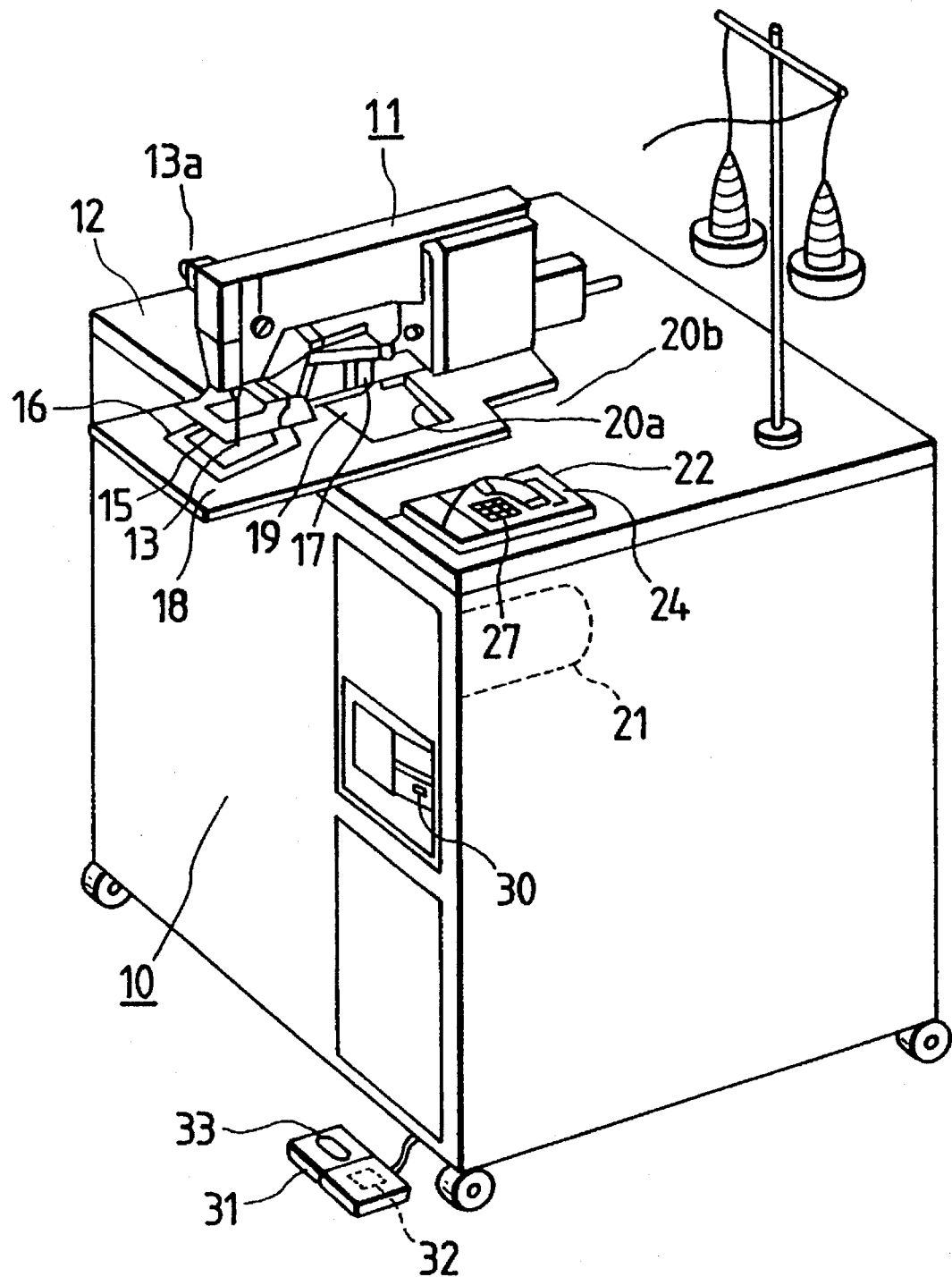
FIG. 6 shows the outside view of a conventional sewing matching.
Figure 7:
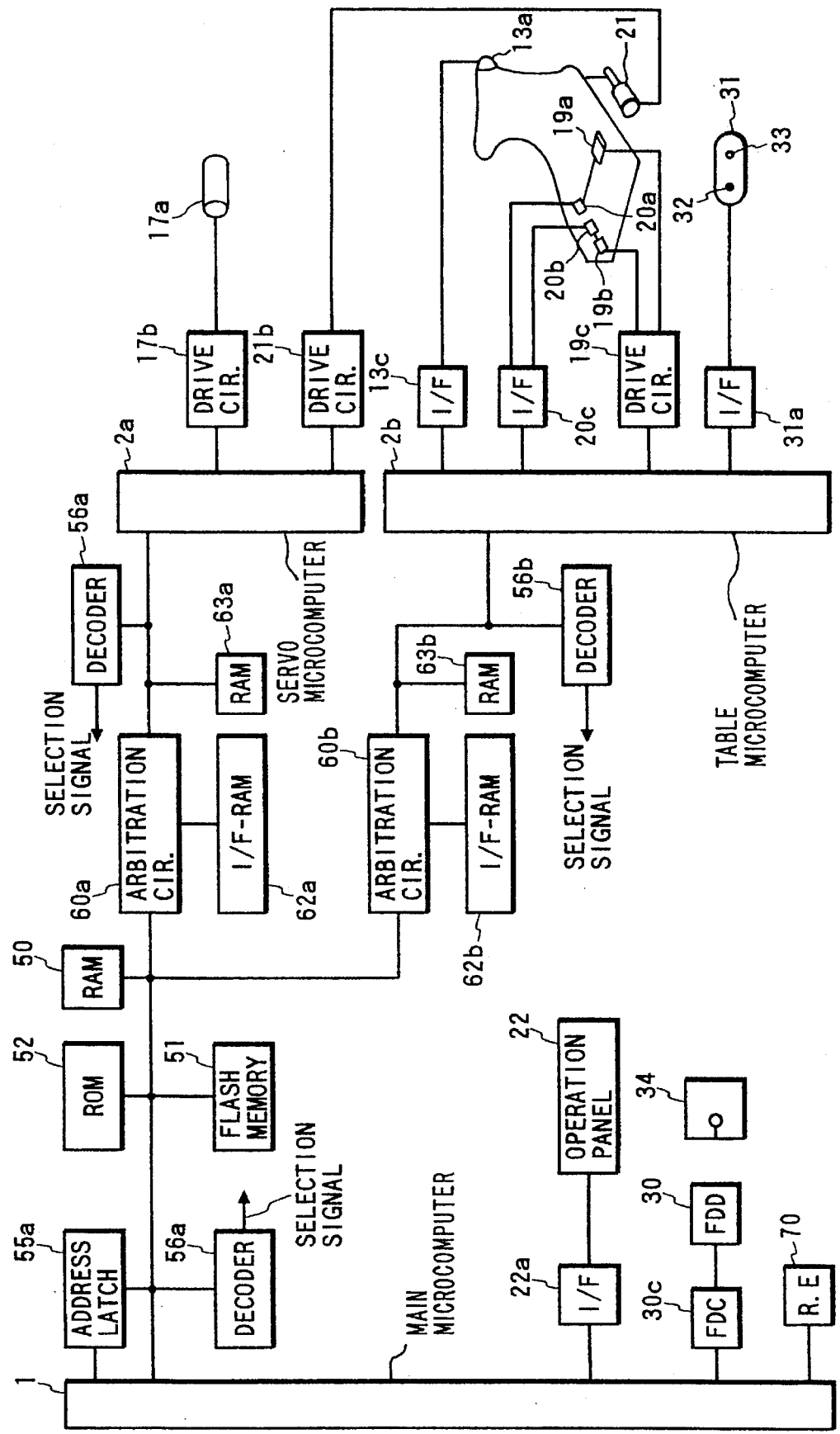
FIG. 7 is a circuit diagram showing a control device of the conventional sewing machine.

The operation of the control device according to this embodiment will be described with reference to FIG. 5. The power to the control device is turned on, and the program stored in the ROM 52 is executed.

A comparison means carries out comparison as to whether or not the control program areas 100, 101 and 102, the display data area 103, the parameter area 104, and the sewing data area 105 of a plurality of blocks stored in the flash memory 51 immediately after the control device has been activated are correct (steps 870–875).

If these areas are judged as being correct, contents of the control program areas 101 and 102 of the flash memory 51 are transferred to the RAMs 63a and 63b of each microcomputer. Thereafter, control is transferred to the control program of the main microcomputer 2 stored in the flash memory 51.

The comparison means calculates a sum or an exclusive OR, and a difference for the contents of each area using a computation means, and compares a reference value stored at a specific address which is obtained by previously performing similar calculation with the calculated value. If the reference value and the calculated value do not match each other, the contents of the compared area are judged as being defective.

If the control program area 100 is judged as being defective, a control program stored in the FD 34 is read, and the thus read control program is transferred to the control program area 100 of the flash memory 51 (step 880). If the control program area 101 is judged as being defective, a control program stored in the FD 34 is read, and the thus read control program is transferred to the control program area 101 of the flash memory 51 (step 881).

If the control program area 102 of the microcomputer 2 is judged as being defective, the control program stored in the FD 34 is read, and the thus-read control program is transferred to the control program area 102 of the flash memory 51 (step 882).

If the display data area 103 is judged as being defective, the display data stored in the FD 34 are read, and the thus read display data are transferred to the display data area 103 of the flash memory 51 (step 883).

If the parameter area 104 is judged as being defective, the parameters stored in the FD 34 are read, and the thus read parameters are transferred to the parameter area 104 of the flash memory 51 (step 884).

If the sewing data area 105 is judged as being defective, the sewing data stored in the FD 34 are read, and the thus read sewing data are transferred to the sewing data area 105 of the flash memory 51 (step 885).

After the data or parameters have been transferred, the contents of the control program areas 101 and 102 of the flash memory 51 are transferred to the RAMs 63a and 63b of each microcomputer. Thereafter, control is transferred to an execution program of the main microcomputer 1 stored in the flash memory 51 (step 887). In this embodiment, steps 880 to 885 act as a third transmission means, and steps 870 to 875 act as the computation means and the comparison means.

According to the invention, it is possible to read the memory contents of the third memory element even if the second microcomputer generates an interrupt, resulting in a sewing machine having superior readiness.

The memory contents of the first memory element are changed by using the language selected by the language selection means. The memory contents of this memory element can thus be efficiently changed.

Even if the memory contents of the first memory element are rewritten for any reason, it is possible to restore the memory contents to their original states, and hence a control device having a high reliability can be obtained.

What is claimed is:

1. A control device for a sewing machine, comprising:

a plurality of microcomputers including a first microcomputer for issuing a control instruction to a second microcomputer, and the second microcomputer for controlling a servomotor which serves as a drive source for stitching an article to be stitched;

a readable and writable non-volatile first memory element for storing programs of the plurality of microcomputers;

a second memory element capable of being accessed for reading by any of the plurality of microprocessors, for reading and storing contents stored in the first memory element;

a third memory element capable of being accessed by the second memory element for reading and writing of the program of the second microcomputer;

first transfer means for writing and storing the program of the second microcomputer from the first memory element into the second memory element when the program of the first microcomputer is started;

second transfer means for storing, in the third memory element, the program transferred to and stored in the second memory element;

address changeover means for switching between start addresses of the second memory element and the third memory element;

element selection means for selecting the second memory element or the third memory element;

memory map reversing means for reversing memory maps of the second memory element and the third memory element based on a signal from the address changeover means and a signal from the element selection means, and for selecting the third memory element; and interrupt means for causing the memory map reversing means to reverse the memory maps after the program of the second microcomputer has been stored into the second and third memory elements by the first and second transfer means, and for causing the second microcomputer to interrupt the third memory element after the third memory element has been selected.

2. The control device for a sewing machine as defined in claim 1, wherein the first memory element includes memory areas for storing the respective programs of the first and second microcomputers and a memory area for storing sewing data, the control device further comprising:

selection means for selecting among the memory areas of the first memory element;

language selection means for selecting a language to be used in altering contents of the memory area; and alteration means for altering the contents of the memory area selected by the selection means by using the language selected by the language selection means.

3. The control device for a sewing machine as defined in claim 1, further comprising:

a fourth memory element for storing the same memory contents as the first memory element;

computation means for executing a program in a memory area of the first memory element, to obtain a prescribed calculated value;

comparison means for judging, by comparison, whether a pre-calculated reference value coincides with the calculated value of the computation means; and third transfer means for transferring the contents of a memory area of the first memory element from a memory area of the fourth memory element when the comparison means finds a disagreement.

4. A control method for a sewing machine which is provided with a first microcomputer for issuing a control instruction to a second microcomputer and the second microcomputer for controlling a servomotor which serves as a drive source for stitching an article to be stitched, the control method comprising the steps of:

transferring memory contents of a first memory element which stores respective programs of the first and second microcomputers to a second memory element when the program of the first microcomputer is started;

transferring the memory contents transferred to the second memory element to a third memory element;

reversing memory maps of the second memory element and the third memory element, and causing the second microcomputer to select the third memory element; and causing the second microcomputer to interrupt the third memory element.

* * * * *